US004001578B2

United States Statutory Invention Registration [19]

[11] Reg. Number: H1578

Taguchi

[45] Published: Aug. 6, 1996

[54] SILVER HALIDE PHOTOGRAPHIC LIGHT-SENSITIVE MATERIAL

[76] Inventor: Masaaki Taguchi, c/o Konica Corporation 1 Sakura-machi, Hino-shi, Tokyo, Japan

[21] Appl. No.: 351,753

[22] Filed: Dec. 8, 1994

[30] Foreign Application Priority Data

Dec. 21, 1993 [JP] Japan ..... 5-322481

[51] Int. Cl.[6] ..... G03C 1/76

[52] U.S. Cl. ..... 430/523; 430/527; 430/530; 430/630; 430/529; 430/531; 430/631

[58] Field of Search ..... 430/523, 527, 430/530, 630, 529, 531, 631

[56] References Cited

U.S. PATENT DOCUMENTS

| | | | |
|---|---|---|---|
| 4,394,441 | 7/1983 | Kawaguchi et al. | 430/524 |
| 4,418,141 | 11/1983 | Kawaguchi et al. | 430/530 |
| 4,495,275 | 1/1985 | Yokoyama et al. | 430/527 |
| 4,917,993 | 4/1990 | Mukunoki et al. | 430/523 |
| 5,045,441 | 9/1991 | Takamuki et al. | 430/527 |
| 5,254,448 | 10/1993 | Yamada et al. | 430/523 |
| 5,284,714 | 2/1994 | Anderson et al. | 430/527 |
| 5,372,923 | 12/1994 | Kurachi et al. | 430/527 |
| 5,376,517 | 12/1994 | Kurachi et al. | 430/527 |

*Primary Examiner*—Charles T. Jordan
*Assistant Examiner*—John R. Hardee

[57] ABSTRACT

A silver halide photographic light-sensitive material is disclosed. The light-sensitive material comprises a support having thereon a silver halide emulsion layer and optionally a hydrophilic colloid layer, at least one of said emulsion layer and said hydrophilic colloid layer contains a water-soluble polymer which comprises repeating unit represented by formula 1 in an amount of 10 to 100 mol %, and a electric conductive layer being provided between the support and the silver halide emulsion layer and comprising a binder and fine particles of an electric conductive crystalline metal oxide of ZnO, $TiO_2$, $SnO_2$, $Al_2O_3$, $In_2O_3$, $SiO_2$, MgO, BaO, $MoO_3$, $V_2O5$ or a mixture thereof, each of which has a volumetric resistivity of not higher than $10^7$ Ωm;

(1)

wherein $R^1$ and $R^2$ are each independently a hydrogen atom, an alkyl group, a halogen atom or a $—CH_2COOM^1$, in which $M^1$ is a hydrogen atom or an alkyl group having 1 to 8 carbon atoms; L is —CONH—, —NHCO—, —COO—, —OCO—, $—SO_2—$, $—HSO_2—$, $—SO_2NH—$ or —O—; J is an alkylene group, an arylene group or an aralkylene group; Q is a hydrogen atom, $—R^3$, in which $M^2$ is a hydrogen atom or a cation; $R^9$ is an alkyl group having 1 to 4 carbon atoms; $R^3$, $R^4$, $R^5$, $R^6$, $R^7$ and $R^8$ are each independently a hydrogen atom, an alkyl group having 1 to 20 carbon atoms, an alkenyl group, a phenyl group, an aralkyl group; X is an anion; M is a hydrogen atom or a cation; p and q are each 0 or 1; and Y is a hydrogen atom or a $—(L)_p—(J)_q—Q$ group. The light-sensitive material has a good antistatic property without fogging due to a ultra rapid processing.

1 Claim, No Drawings

SILVER HALIDE PHOTOGRAPHIC LIGHT-SENSITIVE MATERIAL

FIELD OF THE INVENTION

The present invention relates to a silver halide photosensitive material, and more particularly relates to an antistatic silver halide photosensitive material capable of being very quickly processed.

BACKGROUND OF THE INVENTION

In general, silver halide photographic light-sensitive material comprises an insulating plastic film support, on which there are provided a light-sensitive emulsion layer, antihalation layer, protective layer, intermediate layer, foundation layer and back coating layer. Therefore, silver halide light-sensitive material is easily charged with static electricity. Especially when the temperature is low, for example, in the winter, silver halide light-sensitive material is charged with static electricity while it is handled, so that problems may be encountered. For example, due to the progress of manufacturing technique of silver halide photosensitive material, the speed of coating and that of cutting are increased in the manufacturing process recently. Therefore, frictional electrification occurs. Further, the speed of film conveyance is remarkably increased in the photographing and processing of films. For this reason, problems are encountered when the films are electrostatically charged.

When photosensitive material is charged with static electricity, foreign objects such as dust are deposited on the surface of photosensitive material. Therefore, serious problems may occur on a developed image. In the case of a medical film, there is a possibility of making a wrong diagnosis. Further, due to the discharge of accumulated static electricity, fog referred to as a static mark is caused, and it becomes impossible to make a correct diagnosis.

In order to solve the above problems, antistatic agents are applied to silver halide photosensitive material. For example, a surface active agent of polyoxyethylene is generally used for the antistatic agent. However, when such a chemical compound is used, there is a possibility that streaks of development are caused due to quick processing. According to the method disclosed in Japanese Patent Publication Open to Public Inspection (JP O.P.I. Publication) No. 142350/1988 in which a highly soluble surface active agent is used, the surface active agent is dissolved in the processing solution in the process of development and reacts with other substances in the solution, so that trubidness, sludge and streaks of development are caused.

In order to solve the above problems, Japanese Patent Examined Publication Nos. 49894/1985 and 16057/1986 disclose the following technique:

A support is used which has an undercoat layer having antistatic properties when the undercoat layer contains a metallic oxide. When the above support is used, even if an amount of the surface active agent of polyoxyethylene is reduced or made to be zero, the occurrence of streaks of development can be reduced without deteriorating the effect of preventing static marks.

However, even in the above method using a metal oxide, the following problem may be encountered:

When the temperature and the value of pH of the developing solution are raised and also an amount of the fog inhibitor is reduced for the purpose of increasing the processing speed, the occurrence of fog is increased.

SUMMARY OF THE INVENTION

It is an object of the present invention to provide silver halide light-sensitive material given a excellent antistatic property without increasing the forming of fog even when the temperature and the value of pH of a developing solution are high, development processing can be carried out very quickly.

The photographic light-sensitive material of the invention comprises a support having thereon a silver halide emulsion layer and optionally a hydrophilic colloid layer, at least one of said emulsion layer and said hydrophilic colloid layer contains a water-soluble polymer which comprises repeating unit represented by formula 1 in an amount of 10 to 100 mol %, and an electric conductive layer being provided at a position between the support and the silver halide emulsion layer and comprising a binder and fine particles of an electric conductive crystalline metal oxide of ZnO, $TiO_2$, $SnO_2$, $Al_2O_3$, $In_2O_3$, $SiO_2$, MgO, BaO, $MoO_3$, $V_2O_5$ or a mixture thereof, each of which has a volumetric resistivity of not higher than $10^7$ Ωcm;

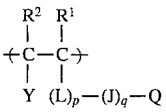

(1)

wherein $R^1$ and $R^2$ are each independently a hydrogen atom, an alkyl group, a halogen atom or a $—CH_2COOM^1$, in which $M^1$ is a hydrogen atom or an alkyl group having 1 to 8 carbon atoms; L is —CONH—, —NHCO—, —COO—, —OCO—, $—SO_2—$, $—HSO_2—$, $—SO_2NH—$ or —O—; J is an alkylene group, an arylene group or an aralkylene group; Q is a hydrogen atom, $—R^3$,

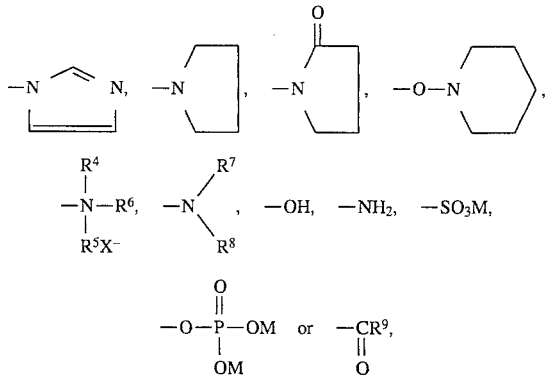

in which $M^2$ is a hydrogen atom or a cation; $R^9$ is an alkyl group having 1 to 4 carbon atoms; $R^3$, $R^4$, $R^5$, $R^6$, $R^7$ and $R^8$ are each independently a hydrogen atom, an alkyl group having 1 to 20 carbon atoms, an alkenyl group, a phenyl group, an aralkyl group; X is an anion; M is a hydrogen atom or a cation; p and q are each 0 or 1; and Y is a hydrogen atom or a $—(L)_p—(J)_q—Q$ group.

The light-sensitive material is adapted to a rapid processing in which whole processes are carried out within 30 seconds in total.

DETAILED DESCRIPTION OF THE INVENTION

Crystalline metal oxide particles are used for the conductive metal oxide in the present invention. Metal oxide particles containing oxygen defects are preferably used, and also metal oxide particles containing a small amount of another kind of atoms forming an electron donor with respect to the used metal oxide are preferably used because the electric conductivity of such metal oxide is generally high. Especially, the latter is preferably used because the occurrence of fog can be avoided in a silver halide emulsion.

Usable examples of the metal oxide are: ZnO, $TiO_2$, $SnO_2$, $Al_2O_3$, $In_2O_3$, $SiO_2$, MgO, BaO, $MoO_3$ and $V_2O_5$, and their mixtures. Especially, $ZnO_2$, $TiO_2$ and $SnO_2$ are preferably used. Effective examples of a case in which another kind of atoms are contained, are addition of Al or In to ZnO; addition of Sb, Nb or halogen elements to $SnO_2$; and addition of Nb or Ta to $TiO_2$.

An amount of addition is preferably in a range from 0.01 to 30 mol %, and more preferably in a range from 0.1 to 10 mol %.

The metallic oxide particles usable for the present invention are electrically conductive, and the volumetric resistivity there of is not higher than $10^7$ Ωcm, more preferably not lot higher than $10^5$ Ωcm.

The fine particles of the electrically conductive crystalline metal oxide or metal oxide mixture can be prepared by the methods, for example, described in JP I.O.P. Publication 143430/1981. Concretely, they can easily prepared in the following manner: (1) particles of the metal oxide prepared by baking is subjected to heat treatment in the presence of another kind of atom which raises electric conductivity of the metal oxide powder, (2) particles of the metal oxide is prepared by baking in the presence of another kind of atom which raises electric conductivity of the metal oxide powder, or (3) at the time of baking the metal oxide to make fine particles thereof, oxygen concentration in the atmosphere is lowered for introducing oxygen vacancies into the metal powder.

The size of particles is preferably 0.01 to 0.7 μm, and more preferably 0.02 to 0.5 μm.

These oxides are described in JP O.P.I. Publication Nos. 143431/1981, 120519/1981 and 62647/1983.

The conductive metal oxides usable in the present invention are dispersed in the binder and provided between the support and the silver halide emulsion layer.

In order to reduce the resistance of the conductive layer by effectively utilizing these conductive oxides, it is preferable that the volumetric content of the conductive metal oxide particles in the layer is high. However, in order to provide a competent mechanical strength, it is necessary to add at least 5% of binder. Therefore, the volumetric content of the conductive metal oxide is preferably in a range from 5 to 95% in value.

It is preferable that the conductive metal oxide is used in an amount of 0.05 to 10 g/m$^2$, more preferably, 0.1 to 5 g/m$^2$, of light-sensitive material. Due to the foregoing, a competent antistatic property can be provided.

In the invention, the conductive layer containing the metal oxide particles is provided as an under-coat layer at a position between the support and the silver halide emulsion layer.

The conductive under-coat layer may be provided in the following manner:

Electrically conductive particles are dispersed in the binder of the under coat layer, and the under coat layer is directly coated on the support. Alternatively, a hydrophilic polymer layer is further coated on it, and an emulsion layer is coated. Usable examples of the binder of the under coat layer are a latex polymer, water soluble polymer, cellulose ester, and soluble polyester.

Usable examples of latex polymers are latex of copolymer containing polyvinyl chloride, copolymer containing vinylidene chloride, glycidyl acrylate, copolymer containing glycidyl methacrylate, copolymer containing alkylester of acrylic acid, and copolymer containing butadiene. Specifically, the latex is described in JP O.P.I. Publication Nos. 135526/1976, 43911/1975, 114120/1976, 121323/1976 and 112677/1977 and Japanese Patent Publication No. 14434/1976.

Examples of the hydrophilic colloid binder usable in the silver halide emulsion layer, hydrophilic colloid layer and the electric conductive particles-containing layer include gelatine, gelatine derivative, maleic anhydride copolymer such as vinyl acetate-maleic anhydride copolymer, and cellulose ester such as cellulose acetate, cellulose acetate butylate and nitrocellulose. Usable examples of soluble polyester are discloses in JP O.P.I. Publication No. 1612/1979, and Japanese Patent Publication Nos. 2529/1969 and 10432/1960.

A matting agent may be added into the protective layer. Usable examples of the matting agent are a homopolymer of polymethyl mathacrylate described in U.S. Pat. Nos. 2,992,101, 2,701,254, 4,142,894 and 4,396,706; a copolymer of methyl methacrylate and methacrylic acid; and particles of starch and silica. Further, the surface active agent may be used together.

A lubricant may be added into the surface protective layer. Usable examples of the lubricant are silicon compounds described in U.S. Pat. Nos. 3,489,576 and 4,047,958, colloidal silica described in Japanese Patent Publication No. 23139/1981, paraffin wax, higher fatty acid ester and starch.

A plasticizer may be added into the hydrophile colloidal layer. Usable examples of the plasticizer are polyol of trimethylol-propane, pentanediol, butanediol, ethyleneglycol and glycerin.

Usable examples of the support used for the present invention are a transparent or opaque synthetic resin film of polyethylene terephthalate, cellulose acetate, polycarbonate, polystyrene and polypropylene and a paper support laminated with polyethylene resin.

The thickness of the support is preferably 50 to 200 μm, and more preferably 100 to 180 μm.

Various types of additives for example, described on pages 22 through 28 of Vol. 176432 of Research Disclosure (RD) published in December of 1978, may be added to the above emulsion layer or hydrophilic colloidal layers.

The method of coating these emulsion layer and hydrophilic colloidal layers is also disclosed in Research Disclosure described above.

In the invention, a water-soluble polymer is added into at least one an emulsion layer or a hydrophilic colloid layer such as a surface protective layer, back-coating layer, intermediate layer, under-coating layer and anti-halation layer other than the layer in which the conductive metal oxide particles are added to make it to a electric conductive layer.

Water soluble polymers usable in the present invention will be explained as follows.

Water solube polymers usable in the invention preferably have a solubility in water of about 0.05 g or more per 100 g of water at the temperature of 20° C. More preferably, the solubility is not less than 0.1 g per 100 g of water at 20° C. It is preferable that the water soluble polymers each has a high solubility with respect to the developing and fixing solutions. The preferable solubility of the water soluble polymer, is not less than 0.05 g per 100 g of the developing solution. The solubility in the developing solution is, more preferably, not less than 0.5 g, and further preferably, not less than 1 g, per 100 g of the developing solution.

Natural or synthetic water soluble polymers may be used. Synthetic water soluble polymers may be used in the invention may have nonionic groups, anionic groups, or both nonionic and anionic groups in the molecular structure. In this case, examples of the nonionic group are an ether group, ethylene oxide group, and hydroxy group. Examples of the anionic group are a sulfonic acid group or its salt, carboxylic acid group or its salt, and phosphoric acid group and its salt.

A homopolymer or copolymer may be used as the synthetic water soluble polymer. As long as the polymer itself is water-soluble, the copolymer partially derived from a hydrophobic monomer may be used.

In some cases, the composition of the copolymer is restricted by a position where it is added and an amount of copolymer to be added. For example, when the copolymer is added to an emulsion layer and the amount of which is large, the composition of the copolymer is determined so that the effect of addition is not deteriorated.

Natural water soluble polymers usable in the invention may have nonionic groups, anionic groups, or both nonionic and anionic groups in the molecular structure.

Preferable water soluble polymers in the invention are ones containing a repeating unit represented by the following formula 1. Especially, the following repeating unit may be contained in the polymer by 10 to 100 mol %.

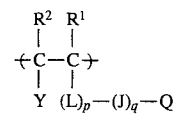

Formula 1

In the formula, $R^1$ and $R^2$ each independently a hydrogen atom, an alkyl group, a halogen atom, or $—CH_2COOM^1$, $M^1$ is a hydrogen atom or an alkyl group having 1 to 8 carbon atoms. In the above, the alkyl group is preferably one having 1 to 4 carbon atoms which may have a substituent, for example, a substituted or unsubstituted methyl, ethyl, propyl or buthyl group.

L represents —CONH—, —NHCO—, —COO, —OCO, —CO—, $—SO_2—$, $—NHSO_2—$, $—SO_2NH—$ or —O—.

J is an alkylene group, prepeferably an alkylene group having 1 to 10 carbon atoms, including one having a substituent such as a substituted or unsubstituted methylen, ethylene, propylene, trimethylene, butylene, and hexylene group; an arylene group including substituted one such as a substituted and unsubstituted phenylene group; or a substituted or unsubstituted aralkylene group such as

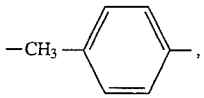

$-(CH_2CH_2O)_m-(CH_2)_n$ or $-(CH_2CHCH_2O)_m-(CH_2)_n$, wherein m is an integer from 0 to 40, and n is an integer from 0 to 4. Q is a hydrogen atom, $—R^3$,

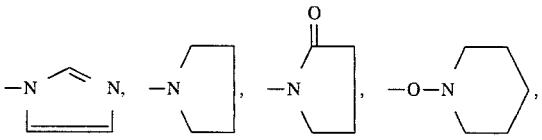

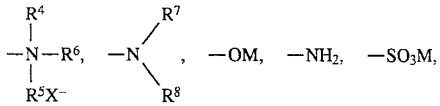

-continued

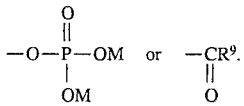

In the above, M is a hydrogen atom or a cation group; $R^9$ is an alkyl group having 1 to 4 carbon atoms such as a methyl, ethyl, propyl or butyl group; $R^3$, $R^4$, $R^5$, $R^6$, $R^7$, $R^8$ and $R^9$ are each independently an alkyl group having 1 to 20 carbon atoms such as a substituted or unsubstituted methyl, ethyl, propyl, butyl, hexyl, decyl or hexadecyl group, an alkenyl group such as a substituted or unsubstituted vinyl or allyl group, a phenyl group such as a phenyl, methoxyphenyl, chlorophenyl group or those each further having a substituent; an aralkyl group such as a substituted or unsubstituted benzyl group; X is an anion; and p and q are each 0 or 1. A polymer containing acrylamide or methacryl amide is particularly preferable.

Y represents a hydrogen atom or —(L—)p—(J—)q—Q.

The repeating unit represented by formula 1 may be copolymerized with ethylenic unsaturated monomer to from the synthetic water soluble polymer. Usable examples of copolymerizable ethylenic monomer includes styrene; alkylstyrene and hydroxylalkylstyrene in which the alkyl group preferably has 1 to 4 carbon atoms, for example, methyl, ethyl and butyl are preferably; vinylbenzenesulfonic acid and its slat; α-methyl styrene; 4-vinylpiridine; N-vinylpyrolidone; monoethylenic unsaturated ester of fatty acid such as, vinylacetate and vinylpropionate; ethylenic unsaturated monocarboxylic or dicarboxylic acid and its salt, for example, acrylic acid and methacrylic acid; maleic acid anhydride; ethylenic unsaturated monocarboxylic acid or ester of dicarboxylic acid, for example, n-butyl acrylate, N, N-diethylaminoethyl mathacrylate; and an amide of ethylenic unsaturated monocarboxylic acid or carboxylic acid, for example, acrylamide, 2-acrylamide-2-methylpropane sulfonate, N, N-dimethyl-N'-methacryloylpropanediamine acetate betaine.

Next, examples of the specific chemical compound of the synthetic water-soluble polymer having the repeating unit shown in the general formula 1 will be described below. The values written in parentheses are number average molecular weights Mn.

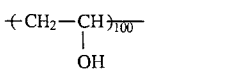

(8,000) I-1

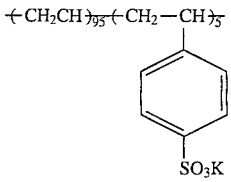

(15,000) I-2

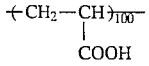

(4,800) I-3

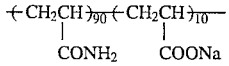

(9,000) I-4

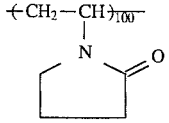

(3,100) I-5

-continued

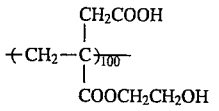

I-6 (11,000)

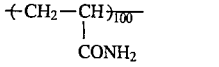

(3,000) I-7

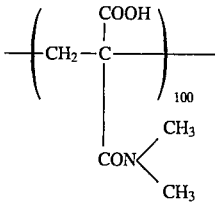

I-8 (8,000)

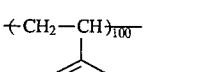

(6,000) I-9

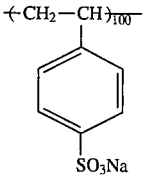

(7,800) I-10

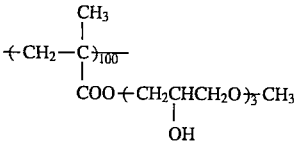

I-11 (10,000)

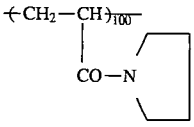

(9,500) I-12

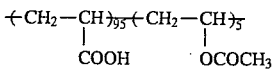

(9,000) I-13

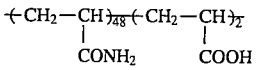

(12,000)I-14

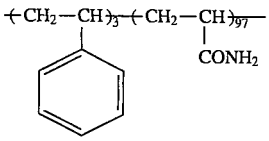

(5,300) I-15

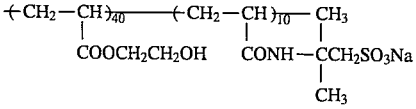

(8,000) I-16

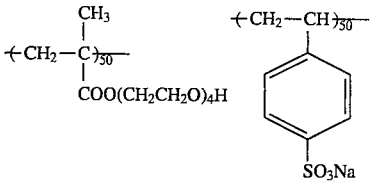

I-17 (10,500)

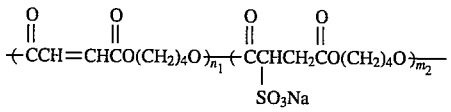

I-18

Wherein, $n_1:n_2$=50 mol %: 50 mol %, and the number average molecular weight (Mn)=about 10,000.

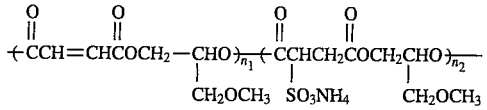

I-19

Wherein, $n_1:n_2$=75 mol %:25 mol %, and Mn=about 20,000.

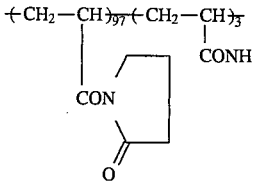

(8,000) I-20

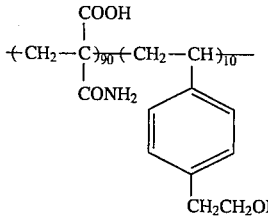

I-21 (11,000)

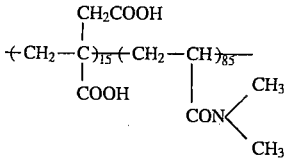

I-22 (9,000)

(11,500)I-23

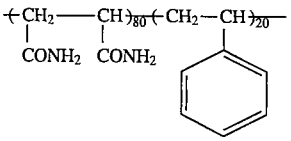

(8,500) I-24

When the above synthetic water soluble polymers are used, the molecular weight is preferably 1,000 to 100,000, and more preferably 2,000 to 50,000.

Examples of usable natural water soluble polymers are described in "Technical Data of Water Soluble Polymer and Water Dispersion Resin", 1981, published by Business Development Center Publishing Department. Usable examples of the natural water soluble polymers are lignin, starch, pullulan, cellulose, alginic acid, dextran, dextrin, guar gum, gum arabic, pectin, casein, agar, xanthan gum, cyclodextrin, locust bean gum, tragacanth gum, carrageenan, glycogen, laminaran, lichenin, nigeran, and their derivatives.

Preferable derivatives of the natural water soluble polymers include ones each having a sulfo group, a carboxyl group, a phosphoric acid and its salt group, a sulfoalkyl group, carboxylalkylene group, an alkylphsphoric group and its salt, an polyoxalkylene group such as polyoxyethylene, polyoxyglyceline, polyoxypropylene group and an alkyl group such as methyl, ethyl and benzyl group.

Concerning the natural water soluble polymers, two or more kinds of them may be used together.

Concerning the natural water soluble polymers, a glucose copolymer and its derivatives are preferably used. Especially, starch, glycogen, cellulose, lichenin, dextran and nigeran are preferably used. Dextran and its derivatives are more preferably used.

Dextran is a polymer of D-glucose of α- 1,6 bond. In general, dextran is obtained when dextran producing bacteria are cultured in the presence of sugars. When dextran sucrase separated from the culture medium of dextran producing bacteria such as leuconostoc and mesenteriodes is reacted with sugars, dextran can be obtained. When the obtained native dextran is subjected to the partially decomposing polymerization in which acid or alkali enzyme is used, the molecular weight is lowered to a predetermined value, so that the dextran of which the limiting viscosity number is in a range from 0.03 to 2.5 can be provided.

Examples of modified dextran are dextran sulfate, carboxyalkyldextran, and hydroxialkyldextran. The molecular weight of the natural water soluble polymer is preferably 100 to 100,000, and more preferably 2,000 to 50,000.

Producing methods of dextran and its derivatives are described in Japanese Patent Publication Nos. 11989/1960, 12820/1970, 18418/1970, 40149/1970, 31192/1971 and U.S. Pat. No. 3,762,924.

In the present invention, an adding amount of synthetic or natural the water soluble polymer is preferably 0.01 to 3.0 $g/m^2$, and more preferably 0.05 to 1.0 $g/m^2$.

Silver halide photosensitive material according to the invention can be applied for any types of photographic material such as medial radioactive ray radigraphic material, laser beam recording photographic material, directly positive type photographic material, photographic material for graphic arts, color negative photographic material, reversal color photographic material, color photographic paper thermal development photographic material, and diffusion transfer type photographic material.

Silver halide emulsion usable in the silver halide photographic material of the present invention includes silver chloride, silver bromide, silver chlorobromide, silver iodobromide and silver chloroiodobromide emulsions having arbitrary halide composition. However, from the viewpoint of high sensitivity, silver bromide or silver iodobromide having an average content of silver iodide of 0 to 5.0 mol, and preferably 0.1 to 3.0 mol, is preferably used.

In silver halide emulsion, the composition of halide may be uniform in the particles, or silver iodide may be partially localized. It is preferable that silver iodide is locatized at the center portion of the silver halide grain.

Methods of producing silver halide emulsion are described in JP O.P.I. Nos. 113926/1983, 113927/1984, 113934/1983 and 1855/1987, and European Patent Nos. 219,849 and 219,850. For preparing monodispersed tabular silver halide emulsion, JP O.P.I. No. 6643/1986 can be referred.

A tabular silver iodobromide emulsion having a high aspect ratio can be prepared by the followings. An aqueous solution of silver nitrate or aqueous solution of silver nitrate and that of halide are simultaneously added to an aqueous gelatine solution, maintaining the pBr value to be not more than 2, to form seed crystals. Then the seed crystals are made to grow by the double jet method.

Various photographic additives may be added to the silver halide emulsion applied to the invention, at a time during physical ripening or before and after chemical ripening. Examples of well known additives are described in Research Disclosure (RD), the volumes of which are No. 17643 (published in December of 1978), No. 18716 (published in November of 1979) and No. 308119 (published in December of 1989). Types of these compounds and pages of Research Disclosure on which these compounds are described are as follows.

| | RD-17643 | | RD-18716 | | RD-308119 | |
|---|---|---|---|---|---|---|
| Additive | Page | Classification | Page | Classification | Page | Classification |
| Chemical sensitizer | 23 | III | 648 | Upper right | 996 | III |
| Spectral sensitizer | 23 | IV | 648–649 | | 996–998 | IVA |
| Desensitizing dye | 23 | IV | | | 998 | IVB |
| Dye | 25–26 | VIII | 649–650 | | 1003 | VIII |
| Development accelerator | 29 | XXI | 648 | Upper right | | |
| Antifogging agent | 24 | IV | 649 | Upper right | 1006–1007 | VI |
| Whitening agent | 24 | V | 998 | V | | |
| Hardening agent | 26 | X | 651 | Left | 1004–1005 | X |
| Surface active agent | 26–27 | XI | 650 | Right | 1005–1006 | XI |
| Antistatic agent | 27 | XII | 650 | Right | 1006–1007 | VIII |
| Plasticizer | 27 | VII | 650 | Right | 1006 | XII |
| Lubricant | 27 | VII | | | | |
| Matting agent | 28 | XVI | 650 | Right | 1008–1009 | XVI |
| Binder | 26 | XXII | | | 1003–1004 | IV |

Supports usable for the photosensitive material of the present invention are described on page 28 in Vol. 17643 and on page 647 in Vol. 18716 of Research Disclosure.

A polyethylene terephthalate film is appropriately used for the support. A subbing layer is preferably provided on the surface of the support, and also it is preferable that the surface of the support is subjected to corona discharge or ultraviolet ray irradiation so that the coating layers can be appropriately adhered on the surface.

Photographic processing of the photographic material of the invention is preferably carried out in 30 seconds that is a period of time from when a fore end of the photosensitive material to be processed enters a film insertion sensor of the automatic developing apparatus to when the fore end of the photosensitive material reaches a discharge sensor of the automatic developing apparatus. In the developing apparatus, for example, processing may be carried out by the .processing solution described on pages 29 to 30 of XX to XXI of the above RD-17643, or pages 1011 to 1012 of XX to XXI of the above RD-308119. This photographic processing may be a monochromatic processing. The processing temperature is commonly in a range from 18° C. to 50° C.

In the monochromatic photographic processing, the following developing agents are used alone or in combination: hydroxybenzene (for example, hydroquinone), 3-pyrazolidone (for example, 1-phenyl-3-pyrazolidone), and aminophenol (for example, N-methyl-p-aminophenol). In this connection, well known preservatives, an alkaline agent, pH buffer, antifogging agent, development accelerator, surface active agent, antifoaming agent, color toning agent, water sofener, dissolution assistant, and thickener, may be used in the developer according to necessity.

Tiosulfate or tiocyanate is used for the fixing agent. Water soluble aluminum salt such as aluminum sulfate or potash alum may be contained as a hardening agent. Preservatives, pH adjusting agent and water sofener may be contained.

EXAMPLE

Example 1

Preparation of supports A and B

A 175 μn thick polyethylene terephthalate film, which was tinted to be blue with a density of 0.15, was subbed on both side with the following composition, so that the support (A) was prepared.

| | |
|---|---|
| Gelatine | 30 mg/m$^2$ |
| Salicylic acid | 15 mg/m$^2$ |

Reacted product of polyamide composed of diethylenetriamine and amidine acid with epichlorohydrin 30 mg/m$^2$.

A conductive under coat layer of the following composition was coated on both sides of the above subbed support (A), so that the support (B) was prepared. $SnO_2$/Sb used in support (B) had a volumetric resistivity of 3.5 Ω·cm.

Further support (C) was prepared in the same manner as in support (B) except that $SnO_2$/Sb was replaced by $ZnO_2$/Al particle having an average sized of 0.6 μm, $ZnO_2$/Al ratio in mol of 9/1 and a volumetric resistivity of $3\times10^2$ Ω·cm.

| | |
|---|---|
| Gelatine | 30 mg/m$^2$ |
| $SnO_2$/Sb (the mol ratio is 8/2, and the average particle size is 0.25 μm) | 300 mg/m$^2$ |
| $C_9H_{19}$—$C_6H_4$—$O(CH_2CH_2O)_8H$ | 3 mg/m$^2$ |

Preparation of emulsion Em-1

Preparation of seed emulsion.

A hexagonal tabular seed emulsion was prepared by the following method.

| (Solution A) | |
|---|---|
| Ossein gelatine | 60.2 g |
| Distilled water | 20.0 l |
| Sodium salt of polyisopropyleneoxy-polyethyleneoxy-dicuccinate | 5.6 ml |
| KBr | 26.8 g |
| 10% $H_2SO_4$ | 144 ml |
| (Solution B) | 3500 ml |
| 2.5N $AgNO_3$ aqueous solution | |
| (Solution C) | |
| KBr | 1029 g |
| KI | 29.3 g |

Distilled water is added so that the total amount is made to be 3500 ml.

| (Solution D) | |
|---|---|
| 1.75N KBr water solution | an amount necessary to maintain the silver electrode potential at the following value |

At a temperature of 35° C., using the mixing and stirring apparatus described in Japanese Patent Nos. 58288/1983 and 58289/1983, 64.1 ml of solution B and also 64.1 ml of solution C were added to 64.1 ml of solution A by a double-jet mixing method spending 2 minutes so as to form nucleuses.

After the stop of addition of solutions B and C, the temperature of solution A was raised to 60° C. spending 60 minutes. Then solutions B and C were added by a double-jet mixing method at a flow rate of 68.5 ml/min for 5 minutes. During this operation, the silver electrode potential of the emulsion was controlled to be +6 mV using solution D, wherein the silver electrode potential was measured by the silver ion selecting electrode while a saturated silver-silver chloride electrode was used as a comparative electrode.

After the addition, the pH value was adjusted to be 6 by 3% KOH, and immediately desalting and washing were carried out so that seed emulsion Em-0 was obtained. The seed emulsion Em-0 was inspected with an electron microscope and it was confirmed that 90% or more of the total projected area of the silver halide particles was composed of hexagonal tabular particles, the adjacent edge ratio of which was 1.0 to 2.0. The average thickness of the hexagonal tabular particles was 0.07 μm, and the average diameter, which is a value converted to the diameter of a circle, was 0.5 μm.

Tabular silver iodide emulsion EM-1 was prepared using the following 4 solutions.

| Solution E | |
|---|---|
| Ossein gelatine | 29.4 g |
| Seed emulsion Em-0 | Amount corresponding to 1.6 mol of silver |
| Sodium salt of polyypropyreneoxy-polyethyreneoxy-disuccinate | 2.5 ml |
| Distilled water to make 1400 ml. | |
| Solution F | 2360 ml |
| 3.5N $AgNO_3$ water solution | |
| Solution G | |
| KBr | 963 g |
| KI | 27.4 g |

-continued

| | |
|---|---|
| Distilled water to make 2360 ml. | |
| Solution H | |
| 1.75N KBr | an amount necessary to maintain silver electrode potential at the following value |

At the temperature of 60° C., using the mixing and stirring apparatus described in Japanese Patent Nos. 58288/1983 and 58289/1983, and the overall amounts of solutions F and G were added to solution A by the double jet method at the flow rate of 21.26 ml/min spending 111 minutes so as to form nucleuses. During this operation, the silver electrode potential was controlled to be +25 mV using solution H. Next, in order to remove an excessive amount of salt, precipitation demineralization was conducted using a water solution of Demol N (manufactured by Kao Atlas CO.) and a solution of magnesium sulfate, and an aqueous solution of 92.2 g of ossein gelatin was added so that the total amount was made to be 2500 ml and stirred and dispersed. Thus Em-1 was obtained.

The grains of Em-1 were tabular silver iodide in which the diameter of an average projected area was 0.65 μm, the particle thickness was 0.26 μm, the aspect ratio was 2.5, and the silver iodide content was 1.1 mol%.

Preparation of Em-2

Highly monodispersed cubic silver iodobromide grains were used as seed grains, which had an average grain size of 0.2 μm, an iodide content of 2.0 mol % and a grain size variation coefficient indication monodispersed degree of 0.15. The seed grains were grown with iodobromide having a iodide content of 30 mol % at pH of 9.8 and pAg of 7.8. To thus obtained emulsion, equimoles of potassium bromide and silver nitrate were added at pH of 8.2 and pAg of 7.8 to prepare emulsion Em-2 composed of monodispersed tetradeca-hedral silver iodobromide grains having an average iodide content of 2.2 mol %, average grains size of 0.54 μm and a grain size variation coefficient of 0.17.

The emulsion was desalted by the common floculation sedimentation so as to remove an excessive amount of salt. While the temperature was maintained at 40° C., Demol N, condensated products of formalin and naphthalene sodium sulfonate, and a aqueous solution of magnesium sulfate were added to the emulsion so as to be coagulated, and supernatant liquid was removed.

Distilled water was added to each of obtained silver halide emulsions Em-1 and Em-2 so that the volume was 300 ml per 1 mol of silver. Then the temperature was raised to 55° C., and the spectral sensitizers (A) and (B) described later were added by a total amount of 540 mg in the case of Em-1 and 400 mg in the case of Em-2. The weight ratio of (A) and (B) was 10:1.

After 10 minutes had passed, ammonium tiocyanate was added by an amount of $2\times10^{-3}$ mol and $4\times10^{-3}$ mol with respect to 1 mol of silver to Em-1 and Em-2, respectively. Further, appropriate amounts of chloroauric acid and sodium thiosalfate were added to each emulsions to start chemical ripening. The ripening was carried out at pH of 6.5 and silver electrode potential of 50 mV.

With respect to Em-1, fine particles of silver iodide were added by an amount of 4.0 g per 1 mol of silver 70 minutes before the completion of chemical ripening. Further, 4-hydroxy-6-methyl-1,3,3a,7-tetrazinden was added in an amount of $3\times10^{-2}$ mol for stabilization. With respect to Em-2, potassium iodide was added in an amount of 200 mg per 1 mol of silver 15 minutes before the completion of chemical ripening (70 minutes after the start of chemical ripening). Then, 10% (wt/vol) acetic acid was added 5 minutes after, so that the value of pH was lowered to 5.6, and that value of pH was maintained for 5 minutes. Then, a 0.5% (wt/vol) solution of potassium hydroxide was added so that the value of pH was returned to 6.15. After that, 4-hydroxy-6-methyl-1,3,3a,7-tetrazinden was added in an amount of $3\times10^{-2}$ mol for stabilization.

After the preparation of the emulsion coating solution, the value of pH was adjusted to be 6.20 and the silver electrode potential was adjusted to 80 mV at 35° C. using a solution of sodium carbonate and a solution of potassium bromide.

Using the emulsion coating solution described above, samples were prepared in the following manner. The photographic emulsion layer was provided on both side of the support so that the emulsion amount could be 2.0 g/m$^2$ per one side in terms of silver. An amount of gelatine and that of polymer latex per one side were adjusted to be the values shown on Table 1.

Protective layer solution was prepared using the additives described later. The protective layer solution was prepared so that the amount of gelatine and the added amount of polymer latex per one side could be the same as the values described on Table 1. Therefore, together with the emulsion coating solution, the protective layer solution was simultaneously coated on both sides of the support at the speed of 80 m/min using two sets of slide hopper coaters. The coated layers were dried for 2 minutes and 20 seconds. In this way, the samples were obtained. In this case, the supports A and B were used.

The following spectral sensitizers were used for the preparation of samples.

Spectral sensitizer (A)

Anhydride sodium salt of 5,5'-di-chloro-9-ethyl-3,3'-di-(3-sulfopropyl)oxacarbocyanine Spectral sensitizer (B)

Anhydride sodium salt of 5,5'-di-(butoxycarbonyl)-1,1'-diethyl-3,3'-(4-sulfobutyl)-bezimidazolocarbocyanine The following additives were used for the emulsion coating solution.

An amount of addition is shown by an amount per 1 mol of silver halide

| | |
|---|---|
| 1,1-dimethylol-1-bromine-nitromethane | 10 mg |
| t-Butyl catechol | 70 mg |
| Styrene-maleic anhydride copolymer | 2.0 g |
| Nitrophenyl-triphenyl phosphonium chloride | 5.0 mg |
| Ammonium 1,3-dihydroxybenzene-4-sulfonate | 2.0 g |
| Sodium 2-mercaptobenzimidazole-5-sulfonate | 1.5 g |
| $C_4H_9OCH_2CH(OH)CH_2N(CH_2COOH)_2$ | 1.5 G |
| 1-phenyl-5-mercaptotetrazole | 15 mg |
| Water-soluble polymer given in Table 1 | Refer Table 1 |
| | 150 mg |

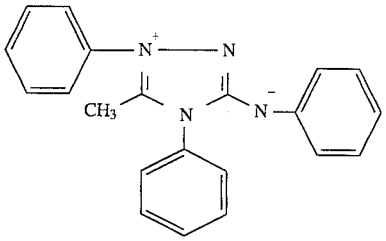

-continued

| | |
|---|---|
| 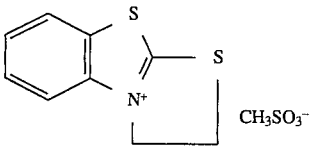 | 70 mg |
| trimethylolpropane | 10 g |
| 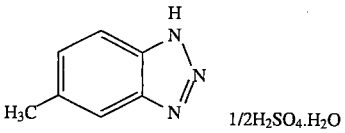 | 500 mg |
| 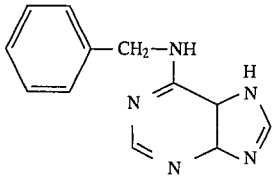 | 100 mg |

Next, additives used for the protective layer solution are shown as follows. Weight shows a value contained in 1 litter of coating solution.

| | |
|---|---|
| Lime-processed inert gelatine | 58 g |
| Acid-processed gelatine | 2 g |
| Sodium i-aluminum-n-decylsulfone succinate | 1.0 g |
| Polymethyl methacrylate | |
| Matting agent, silicon dioxide particle having an area average particle size is 1.2 μm | 0.4 mg |
| Ludox AM (colloidal silica manufactured by Dupon Co.) | 3.0 g |
| 2,4-dichloro-6-hydroxy-1,3,5-triazine sodium salt 2% aqueous solution | 10 ml |
| Glyoxal 40% aqueous solution (hardening agent) | 5.0 ml |
| $(CH_2{=}CHSO_2CH_2)_2O$ (hardening agent) | 36 mg |
| $NaO_3S{-}CH(CH_2COOCH_2(C_2F_4)_3H)COOCH_2(C_2F_4)_3H$ | 0.25 g |
| $C_{12}H_{25}CONH(CH_2CH_2O)_5H$ | 3.0 g |

Dye emulsifying dispersion liquid was prepared as follows. The following dyes were respectively measured so that the amount was 10 kg. Then the dyes were dissolved in a solvent containing 28 litters of tricresyl phosphate and 85 litters of ethyl acetate at 55° C., which is referred to as an oily solution. On the other hand, anion surface active agent and 1.35 kg of the following (AS) were dissolved at 45° C., and 270 millilitters of 9.3% gelatine aqueous solution was prepared, which is referred to as a aqueous solution.

The aforementioned oily and aqueous solutions were put in a dispersion kettle and dispersed while the temperature was controlled to be 40° C.

To the thus obtained dispersion substance, 8 g of the following additive C and 16 litters of water solution of phenol 2.5% and water were added so that the total amount was adjusted to be 240 kg. Then, it was cooled and gelled.

(Dye)

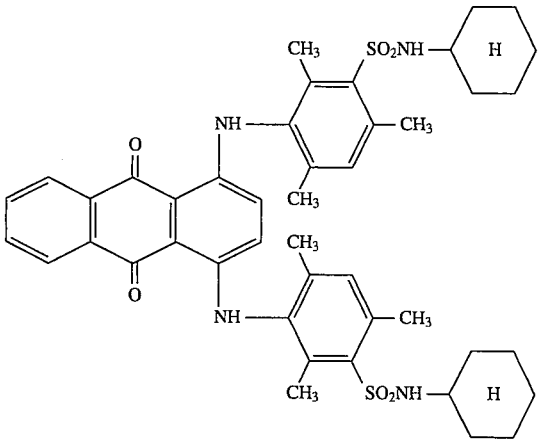

(AS)

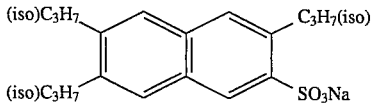

(C)

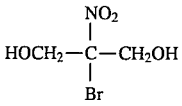

The area average particle sizes of the thus obtained dispersion substance were in a range from 0.12 to 0.14 μm. The above coating solution was uniformly coated on both surfaces of the blue polyethylene terephthalate supports (A) and (B) provided with the above under coat layer. Then the coating solution was dried. In this way, the samples 1 to 10 were made as shown on Table 1. With respect to all samples, an amount of coated gelatine was adjusted so that the amount could be 3.0 g/m$^2$ on both surface. An amount of coated silver on each sample was adjusted to be 2.0 g/m$^2$ on one side.

Sensitometry Test

The obtained samples were exposed to white light in the following manner:

Standard light source B described on page 39 of the second print of the first edition of "New Edition Illumination Data Book" published by the Society of Illumination was used for the light source. The sample was exposed for 0.1 second at 3.2 CMS with no filter. In this white exposure, both sides of a film were exposed so that amounts of exposure light could be the same on both sides. The exposed samples were subjected to development processing by the following method.

The following processing conditions were adopted.

A remodeled automatic processor SRX-502 (manufactured by Konica Co.) was used. A developer and a fixer of the following compositions were used. The developing temperature was 37° C., and the fixing temperature was 33° C. The washing was carried out at 18° C. by supplying water of 7.0 litters per minute. The drying temperature was 55° C. All processes were performed in the following 30 and 45 second modes. The results on Table 1 represent the relative sensitivity in the case where the sensitivity of No. 1 sample was set at 100.

| Process | Processing temperature (°C.) | Processing tie (sec) | Replenishing amount |
|---|---|---|---|
| | 30 Second Processing Mode [Process] | | |
| Insertion | — | 0.8 | |
| Development | 37 | 9.7 | 270 ml/m$^2$ |
| Fixing | 33 | 5.5 | 430 ml/m$^2$ |
| Washing | 18 | 4.8 | 7.0 l/m$^2$ |
| Squeeze | 45 | 3.8 | |
| Drying | 55 | 5.4 | |
| Total | — | 30.0 | |
| | 45 Second Processing Mode [Process] | | |
| Insertion | — | 1.2 | |
| Development | 37 | 14.6 | 270 ml/m$^2$ |
| Fixing | 33 | 8.2 | 430 ml/m$^2$ |
| Washing | 18 | 7.2 | 7.0 l/m$^2$ |
| Squeeze | 40 | 5.7 | |
| Drying | 40 | 8.1 | |
| Total | — | 45.0 | |

In the above, the times of development fixing and washing each includes the time necessary to transporting the sample from a processing tank to the next processing tank.

| | |
|---|---|
| Developer | |
| Part-A (for use in 15 litter finish) | |
| Potassium hydroxide | 470 g |
| Potassium sulfite (50% solution) | 3000 g |
| Sodium bicarbonate | 150 g |
| Diethylene triamine penta-acetic acid, penta-sodium salt | 45 g |
| 5-methylbenztriazole | 2.0 g |
| 1-phenyl-5-mercaptotetrazole | 0.2 g |
| Hydroquinone | 390 g |
| Water to make 5000 ml | |
| Part-B (for use in 15 litter finish) | |
| Glacial acetic acid | 220 g |
| Triethylene glycol | 200 g |
| 1-phenyl-3-pyrazolidone | 27 g |
| 5-nitroindazolol | 0.45 g |
| n-acetyl-D,L-penicillamine | 0.15 g |
| Water to make 5000 ml | |
| Starter (for use in 1.0 litter finish) | |
| Glacial acetic acid | 138 g |

-continued

| | |
|---|---|
| Potassium bromide | 325 g |
| 5-methylbenztriazole | 1.5 g |
| $CH_3N(C_3H_6NHCONHC_2H_4SC_2H_5)_2$ | 20 mg |
| Water to make 1.0 l | |
| To the developer 20 cc/l of starter was added. | |
| Fixer | |
| Part-A (for use in finishing 19 litters) | |
| Ammonium thiosulfate (70 wt/vol %) | 4000 g |
| Sodium sulfite | 175 g |
| Sodium acetate trihydrate | 400 g |
| Sodium citrate | 50 g |
| Gluconic acid | 38 g |
| Boric acid | 30 g |
| Glacial acetic acid | 140 g |
| Part-B (for use in finishing 19 litters) | |
| Aluminum sulfate (in term of anhydrous salt) | 65 g |
| Sulfuric acid (50 wt %) | 105 g |

Measurement of antistatic property

The antistatic property was investigated in the following manner:

Humidity of an unexposed sample was adjusted at 23° C. under the condition of relative humidity 20% for 2 hours. After that, in a dark room maintained under the same air condition, the sample was rubbed by a rubber or nylon roller. The the sample was subjected to the same processing as described above.

The occurrence of static marks was visually evaluated. The reference of evaluation is described as follows.

A: Static marks do not occur.

B: Static marks occur in an area lower 3%.

C: Static marks occur in an area not less than 3% and lower than 10%.

D: Static marks occur in an area not less than 10%.

The results are shown on Table 1.

TABLE 1

| Sample No. | Used support | Used emulsion | Water soluble polymer Exemplified | Amount of addition (g/m$^2$) | Processing time (sec) | Relative sensitivity | Fog | Static marks | Remark |
|---|---|---|---|---|---|---|---|---|---|
| 1 | A | Em-1 | — | — | 30 | 100 | 0.03 | D | Comparative example |
| 2 | B | Em-1 | — | — | 30 | 100 | 0.03 | A | Comparative example |
| 3 | A | Em-1 | I-2 | 0.2 | 30 | 98 | 0.03 | D | Comparative example |
| 4 | B | Em-1 | I-2 | 0.04 | 30 | 100 | 0.03 | A | Present invention |
| 5 | B | Em-1 | I-2 | 0.2 | 30 | 98 | 0.03 | A | Present invention |
| 6 | B | Em-1 | I-2 | 1.0 | 30 | 98 | 0.03 | A | Present |

TABLE 1-continued

| Sample No. | Used support | Used emulsion | Water soluble polymer Exemplified | Amount of addition ($g/m^2$) | Processing time (sec) | Relative sensitivity | Fog | Static marks | Remark |
|---|---|---|---|---|---|---|---|---|---|
| 7 | B | Em-1 | I-17 | 0.5 | 30 | 100 | 0.03 | A | Present invention |
| 8 | B | Em-1 | I-5 | 0.2 | 30 | 100 | 0.03 | A | Present invention |
| 9 | B | Em-2 | I-7 | 0.5 | 30 | 96 | 0.03 | A | Present invention |
| 10 | B | Em-2 | I-23 | 0.5 | 30 | 98 | 0.03 | A | Present invention |
| 11 | A | Em-1 | — | — | 45 | 105 | 0.05 | D | Comparative example |
| 12 | B | Em-1 | — | — | 45 | 105 | 0.08 | A | Comparative example |
| 13 | A | Em-2 | I-2 | 0.5 | 45 | 98 | 0.03 | D | Comparative example |
| 14 | B | Em-2 | I-2 | 0.5 | 45 | 98 | 0.05 | A | Present invention |
| 15 | B | Em-2 | I-5 | 0.5 | 45 | 99 | 0.05 | A | Present invention |
| 16 | C | Em-2 | I-2 | 0.5 | 45 | 98 | 0.05 | A | Present invention |

As can be seen from Table 1, even after the total processing (Dry to Dry) of 30 seconds, the sensitivity of the sample of the present invention was not deteriorated, and the occurrence of fog was low, and the sample of the present invention was excellent in the anti-static mark property.

What is claimed is:

1. A silver halide photographic light-sensitive material comprising a support having thereon a silver halide emulsion layer, and optionally a hydrophilic colloid layer, at least one of said layers containing a water-soluble polymer, and an electric conductive layer being provided between said support and said silver halide emulsion layer and comprising a binder and fine particles of an electric conductive crystalline metal oxide selected from the group consisting of ZnO, $TiO_2$, $SnO_2$, $Al_2O_3$, $In_2O_3$, $SiO_2$, MgO, BaO, $MoO_3$, $V_2O_5$ and a mixture thereof, each of which has a volumetric resistivity of not higher than $10^7$ Ωcm; and wherein said water-soluble polymer is selected from the group consisting of

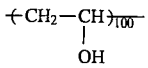
(8,000) I-1

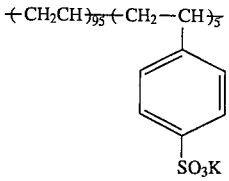
(15,000) I-2

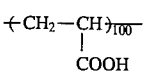
(4,800) I-3

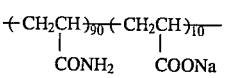
(9,000) I-4

-continued

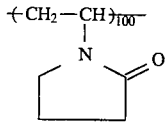
(3,100) I-5

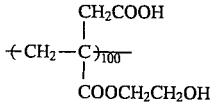
(11,000) I-6

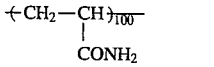
(3,000) I-7

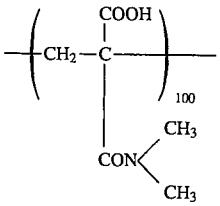
(8,000) I-8

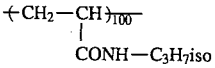
(6,000) I-9

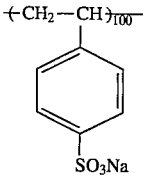
(7,800) I-10

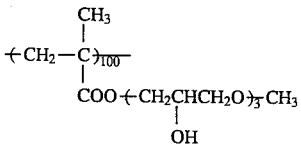
(10,000) I-11

-continued
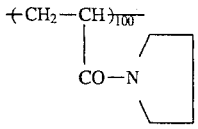
(9,500) I-12
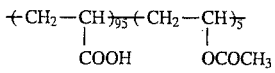
(9,000) I-13
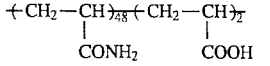
(12,000)I-14
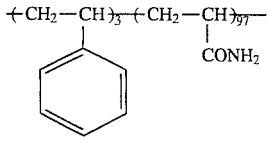
(5,300) I-15
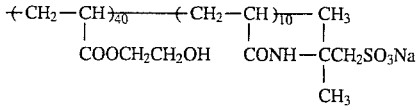
(8,000) I-16
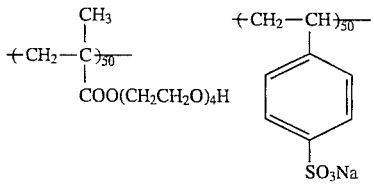
I-17
(10,500)
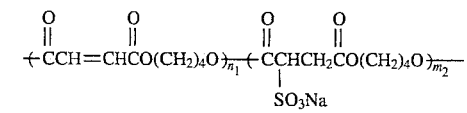
I-18
wherein, $n_1$:$n_2$=50 mol %: 50 mol %, and the number average molecular weight (Mn)=about 10,000,
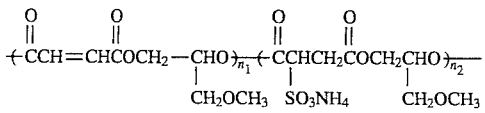
I-19
wherein, $n_1$:$n_2$=75 mol %: 25 mol %, and Mn=about 20,000,
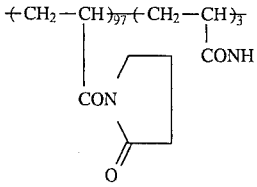
(8,000) I-20
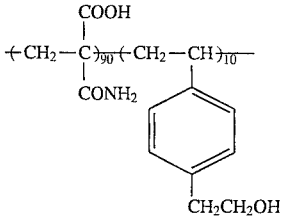
I-21
(11,000)
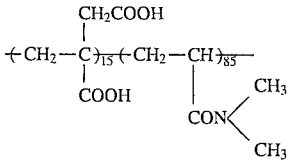
I-22
(9,000)
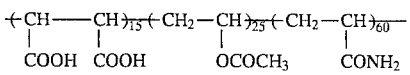
(11,500)I-23
and
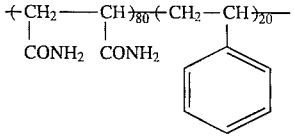
(8,500) I-24
wherein in the above, the values written in parentheses are number average molecular weight.
* * * * *